(12) United States Patent
Yang

(10) Patent No.: US 6,866,243 B2  
(45) Date of Patent: Mar. 15, 2005

(54) INSTANTLY-RELEASED JOINT FOR WATER CONDUITS

(76) Inventor: Shih-Sheng Yang, PO Box 82-144, Taipei (TW)

( * ) Notice: Subject to any disclaimer, the term of this patent is extended or adjusted under 35 U.S.C. 154(b) by 122 days.

(21) Appl. No.: 10/449,024

(22) Filed: Jun. 2, 2003

(65) Prior Publication Data

US 2004/0238777 A1 Dec. 2, 2004

(51) Int. Cl.$^7$ ............................................. F16L 37/38
(52) U.S. Cl. .............................. 251/149.6; 251/149.5; 285/361
(58) Field of Search ................ 251/149, 149.1, 251/149.5–149.7; 285/361; 141/348, 349

(56) References Cited

U.S. PATENT DOCUMENTS

| 4,745,950 A | * | 5/1988 | Mathieu | 137/798 |
| 5,111,838 A | * | 5/1992 | Langston | 137/223 |
| 5,395,348 A | * | 3/1995 | Ryan | 604/247 |
| 6,786,131 B2 | * | 9/2004 | Tsai | 91/432 |

* cited by examiner

Primary Examiner—J. Casimer Jacyna  
(74) Attorney, Agent, or Firm—Leong C. Lei

(57) ABSTRACT

An instantly-released joint for water conduits comprises a first connector in hollow form with one end coupled to a water conduit, and the other end extruding to form a connecting rod having two locking elements on the top; a second connector in hollow form with one end coupled to a water conduit, and the other end provided with locking holes on the surface, while the inner wall of the second connector without locking holes is provided with grooves extended through outside of the second connector; and a pillar plug having a close end and a free end can operate as a valve. The locking elements of the first connector slide along the grooves of the second connector and are engaged in the locking holes after being turned at a certain angle, such that the two water conduits can be coupled with each other to become a thorough conduit. When turning back the joint at a certain angle, the water conduit assembly would be instantly released.

5 Claims, 7 Drawing Sheets

US 6,866,243 B2

INSTANTLY-RELEASED JOINT FOR WATER CONDUITS

BACKGROUND OF THE INVENTION

1. Field of Invention

The invention relates to an instantly-released joint for water conduits, especially to an instantly-released joint which is provided with locking type connectors enabling a user to instantly release and assemble the joint by way of simply turning the joint and instantly separate and couple two water conduits. The integral joint is simply constructed and can be operated easily.

2. Description of the Prior Art

Water conduit devices are commonly used in daily life, such as hoses for gardening, fire distinguishing and car washing purposes. These water conduit devices can be connected and extended by way of a special joint, which should be leakage-proof, instantly assembled and released. Generally, the joints in the markets are complicatedly constructed, unfavorable leakage-proof, and difficultly operated.

In view of the above, there is a need for an instantly-released joint especially applicable to water bag for outdoor sports such that the end of the water conduit can be easily coupled to or released from the water bag for ease of carrying the water bag. Besides, to prevent the extended water conduit from becoming a bar in space to the user, the joint according to the invention has the function of automatic leakage-proof after the water-conduit is released from the water bag.

The invention is positively created by the inventor subject to improvements over the disadvantages of the prior arts through designs and experiments time by time.

SUMMARY OF THE INVENTION

The object of the invention is to provide an instantly-released and assembled joint for water conduit, the two ends of which may be instantly assembled to or released from a water conduit and the water bag for outdoor sports and has the function of leakage-proof.

To obtain the above object, the invention is provided with a first connector and a second connector both in hollow form, wherein the first connector is coupled to a water conduit at one end and extrudes to form a connecting rod at the other end. Locking elements are provided on the connecting rod. One end of the second connector is coupled to the water conduit, while the other end is provided with a locking hole on the surface. Two corresponding grooves are provided on the front-end of the second connector such that the grooves are extended into the locking holes. A pillar plug having openings and a flexible element is provided in the second connector. When the locking elements of the first connector slide along the grooves to the locking holes for engagement or release purposes by way of turning the conduits, so that the two water conduits can be instantly coupled or released.

The detailed construction and other characteristics of the present invention can be better understood by way of reading the following descriptions with reference to the accompanied drawings.

DETAILED DESCRIPTION OF THE INVENTION

Figure 1:
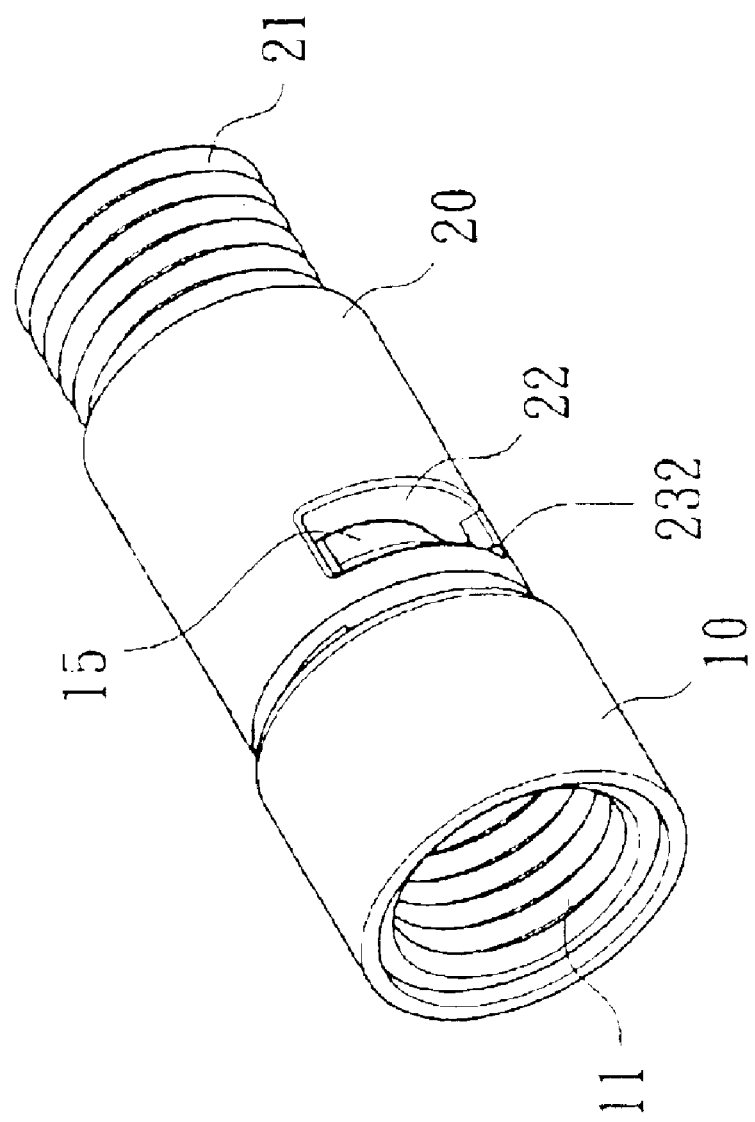
FIG. 1 is a schematic view of the invention.
Figure 2:
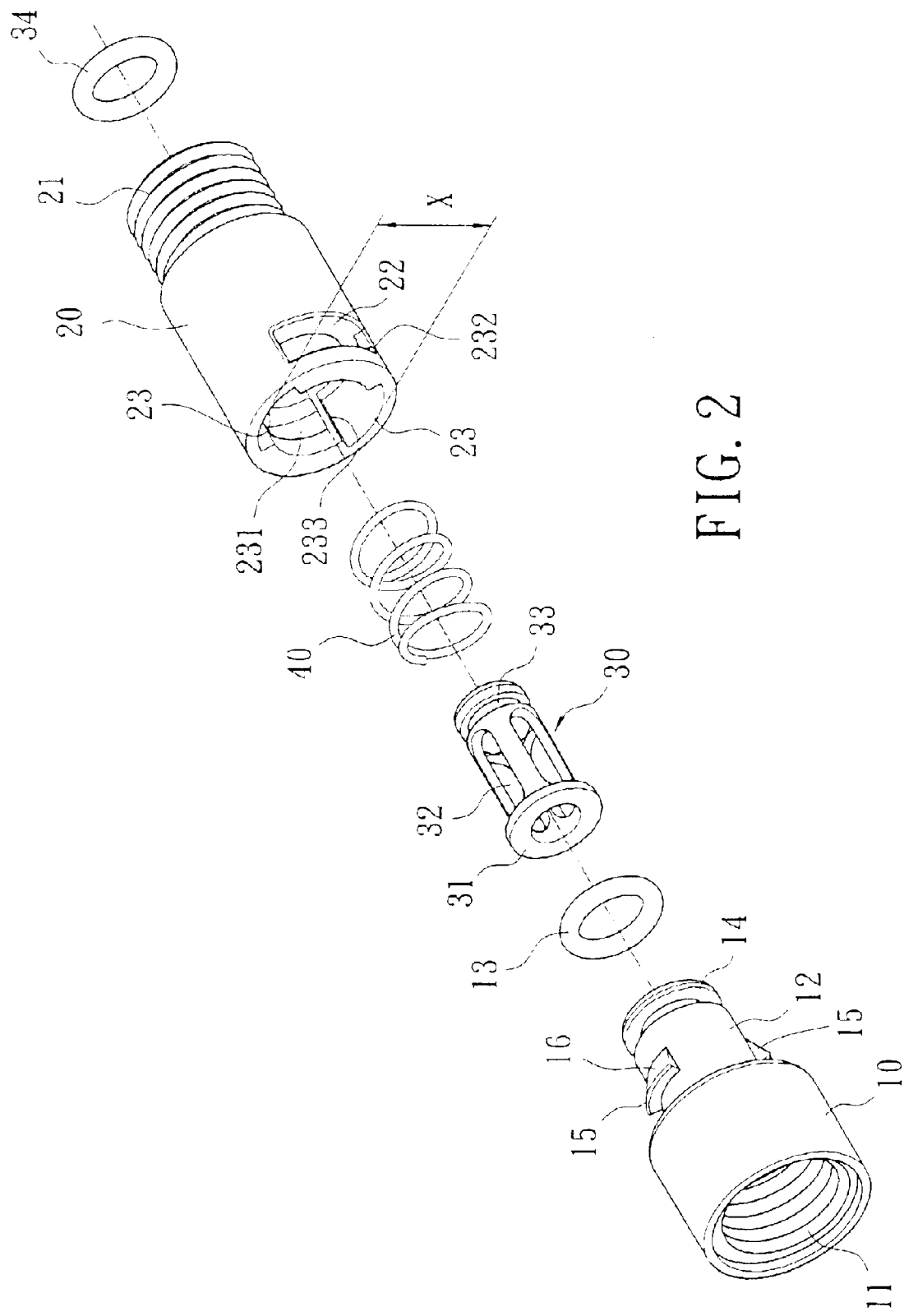
FIG. 2 is an exploded view of the invention.
Figure 3:
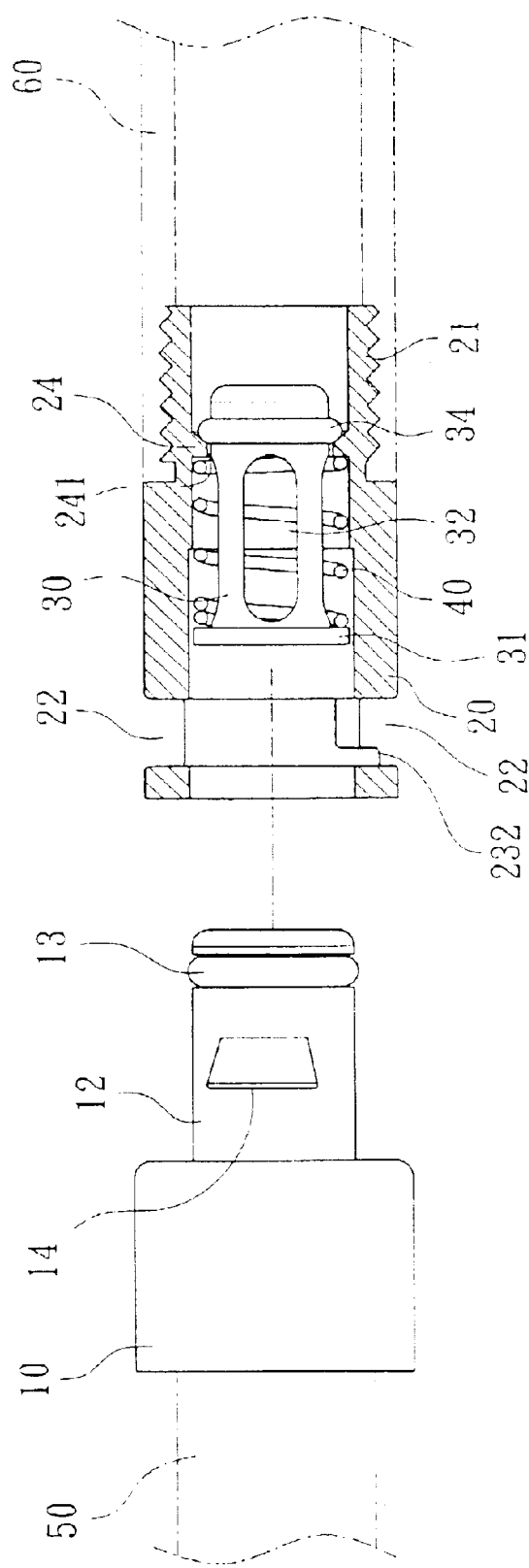
FIG. 3 shows use of an embodiment according to the invention, while the locking elements are not engaged in the locking hole.
Figure 4:
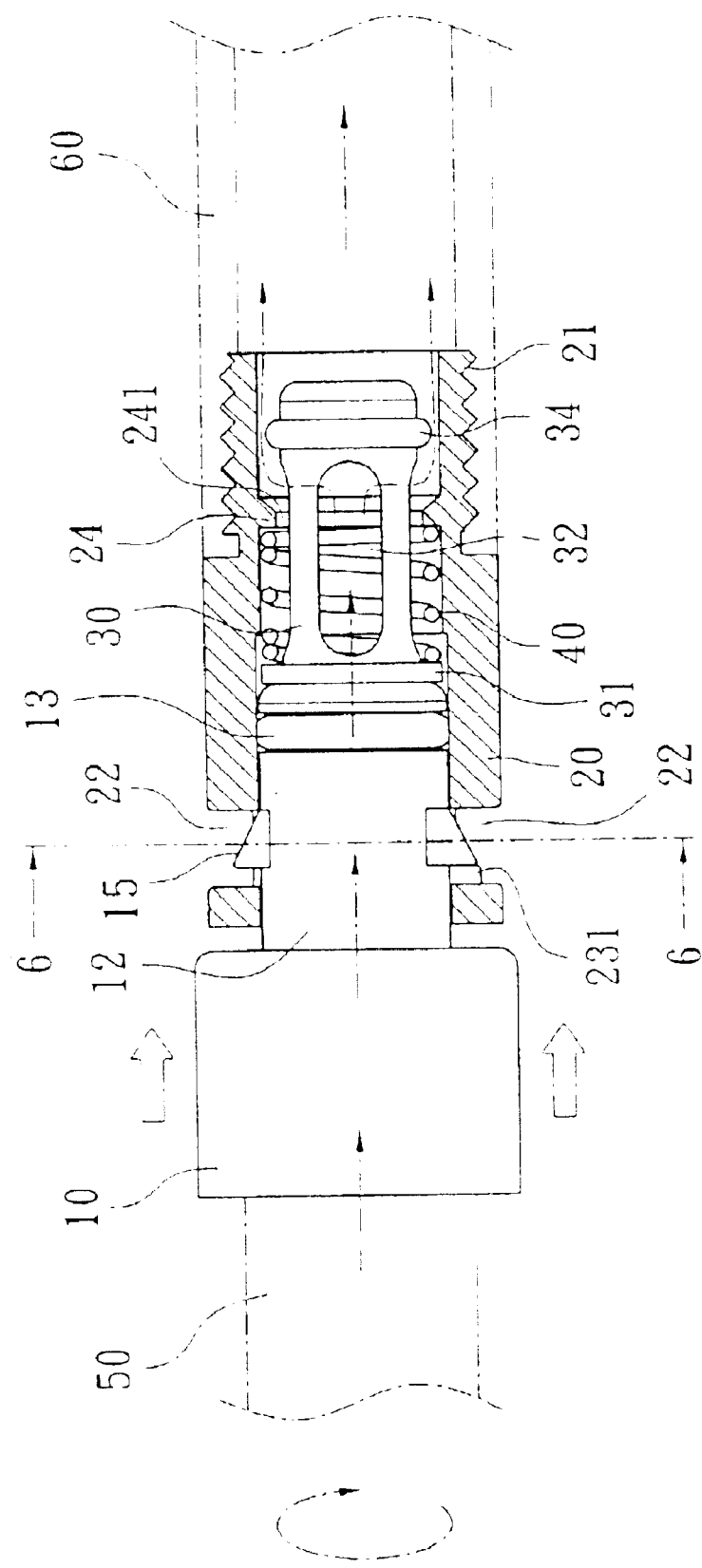
FIG. 4 shows use of an embodiment according to the invention, while the locking elements are engaged in the locking hole.

As shown in FIGS. 1 and 2, the invention comprises a first connector 10, a second connector 20, a pillar plug 30, a spring 40 and a plurality of leakage-proof O-rings (13, 34). The first connector 10 in hollow form is provided with inner threads 11 at the front-end for coupling to a water conduit 30, as shown in FIG. 3. The rear-end of the first connector 10 is extruded to form a connecting rod 12 which is provided with peripheral groove 14 adjacent to the end for mounting a flexible O-ring 13, so that when the O-ring 13 is mounted on the outer rim of the peripheral groove 14, it can block inside of the second connector 20 to prevent water from leaking outside and serve as a water-proof seal when the first connector 10 is coupled to the second connector 20.

Two locking elements 15 are provided on the surface of the connecting rod 12. Each locking element 15 has an inclined plane 16 such that the connecting rod 12 can be easily guided into the grooves 23 of the second connector 20.

The second connector 20 in hollow form is provided with outer threads 21 at the rear-end for being coupled to a water conduit 60. As shown in FIG. 3, it is apparently that flanges 24 are provided on the inner wall of the second connector 20 to form a smaller hole 241 for the purposes of positioning the pillar plug 30 and the flexible elements 40.

Figure 5:
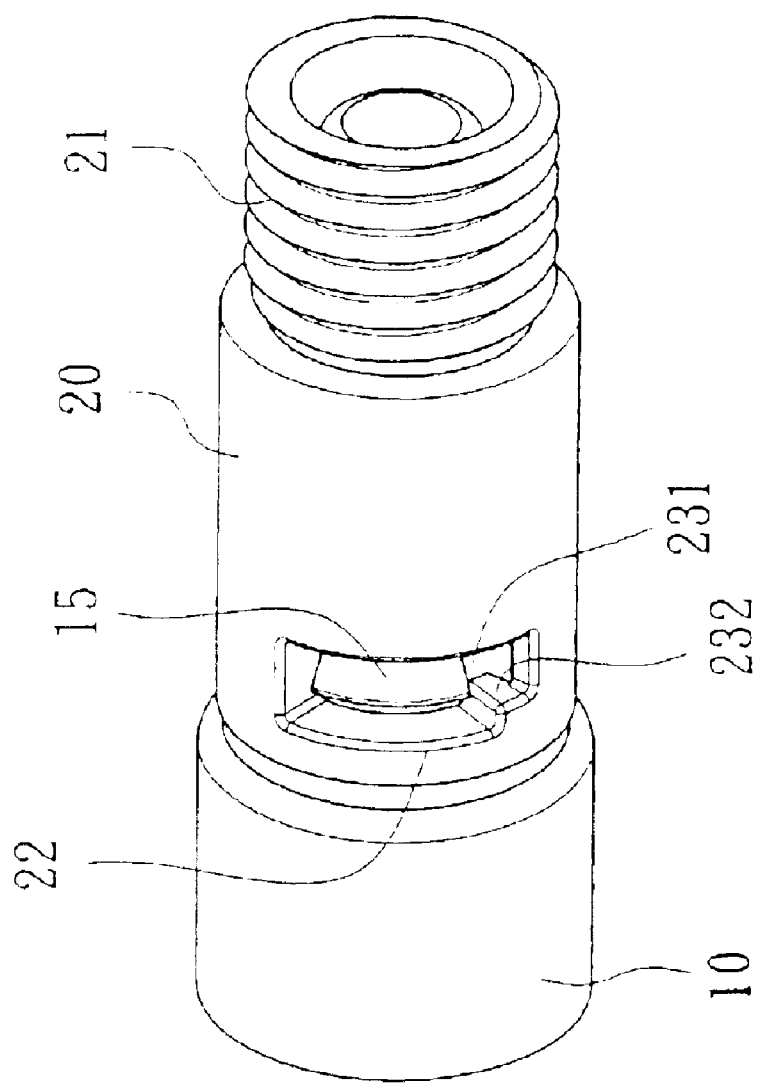
FIG. 5 is a schematic view of the invention, especially shows the construction of the locking hole.

Referring to FIGS. 2 and 5, two locking holes 22 are provided on the corresponding sidewalls of the second connector 20. Two corresponding grooves 23 are provided on the front-end of the second connector 20. The distance X between the two corresponding grooves 23 is longer than the bore diameter Y of the second connector 20 (as shown in FIGS. 2 and 6b), such that lateral sliding grooves 231 can be formed on the front-end section between the corresponding grooves 23. Besides, a locking element 232 is provided on a corner of each locking hole 22 to serve as a stopper 233 on the bottom of the sliding groove 231 (as shown in FIGS. 6a and 6b).

Figure 6A:
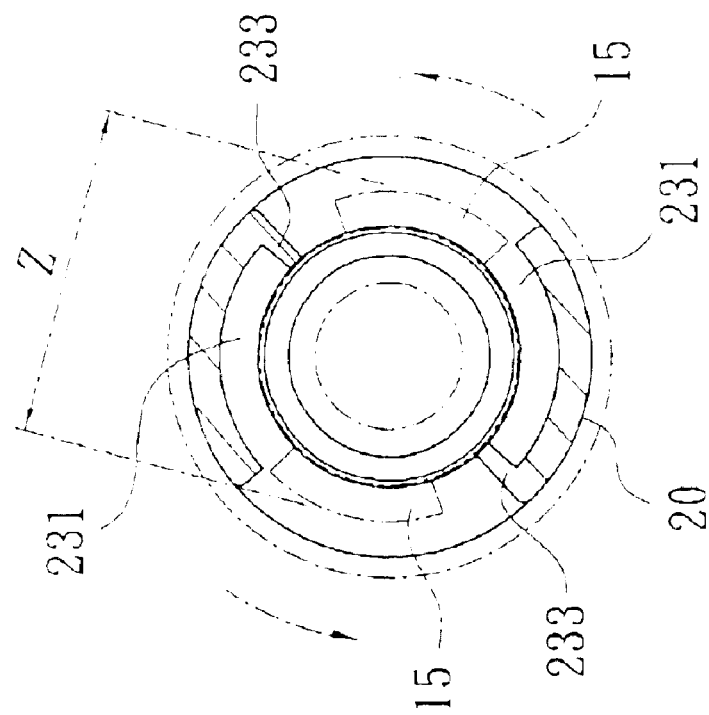
FIG. 6a is a cut-away view taken from FIG. 4, showing that the locking elements are engaged in the locking hole but not turned into the engagement position.
Figure 6B:
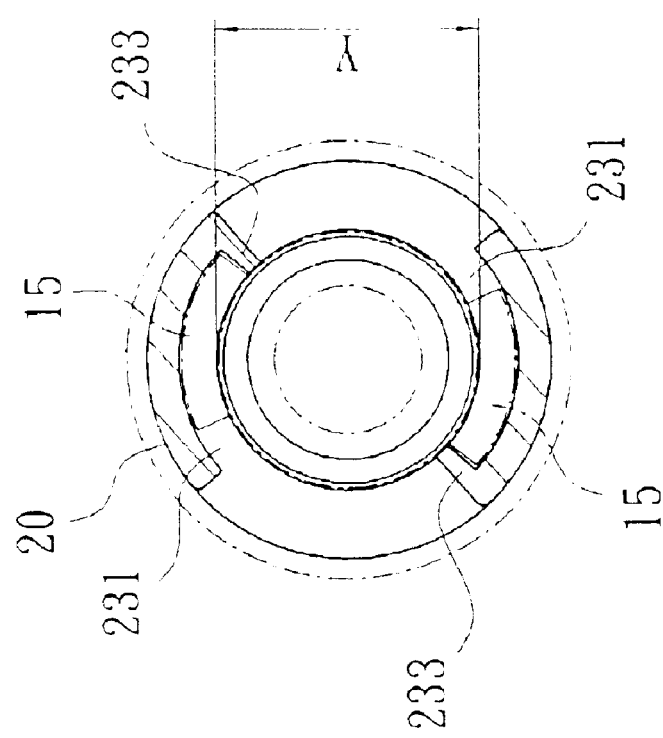
FIG. 6b is a cut-away view taken from FIG. 4, showing that the locking elements are engaged in the locking hole and turned into the engagement position.

Further referring to FIGS. 6a and 6b, the maximum distance X between the two corresponding grooves 23 must be slightly longer than the maximum distance Z between the two locking elements 15 (as shown in FIGS. 2 and 6a), such that the locking elements 15 can slide along the grooves 23 smoothly and be engaged into the locking holes 22. When the locking elements 15 are engaged into the grooves 23 (i.e. the locking elements 15 are in the locking holes 22 but not turned into the sliding grooves 231), the user may turn the first connector 10 and the second connector 20 in different directions such that the locking elements 15 would slide along the sliding grooves 231 on the inner walls of the second connector 20 to the end of the stroke, i.e. the position adjacent to the stopper 233. When the pressure of the first connector 10 has been released, the two locking elements 15 are pushed outwardly by the flexibility of the spring 40 provided inside of the second connector 20 and stopped by the locking elements 232 inside of the hole 22, to become a secure locking condition.

Referring to FIGS. 2 and 3 again, a pillar plug 30 having a close end and a free end may operate as a valve. A relatively great ring 31 is provided on the free end, while a plurality of openings 32 are provided on the surface such that fluid may flow therethrough. The openings 32 are covered by a spring 40, which is against the larger ring 31. A peripheral groove 33 is provided on the close end for mounting a flexible O-ring 34. The pillar plug 30 passes through the hole 241 such that the close end reaches the rear-end of the inner flange 24 of the second connector 20 and the openings 32 mounted inside of the spring 40 is positioned in the front-end of the inner flange 24 of the second connector 20. Accordingly, one end of the spring 40 is against the inner flange 24, and the other end is against the ring 31. By way of the flexibility, the spring 40 extends outwardly and makes the O-ring 34 on the close end adhere to the hole 24, so that when the second connector 20 is not coupled to the first connector 10, a leakage-proof sealing purpose can be obtained.

Figure 7A:
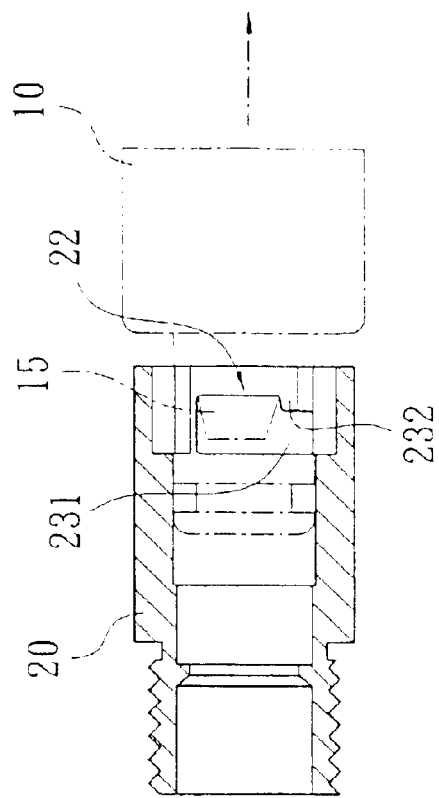
FIG. 7a shows the process that the locking elements are being engaged in the locking hole and turned into the engagement position.
Figure 7B:
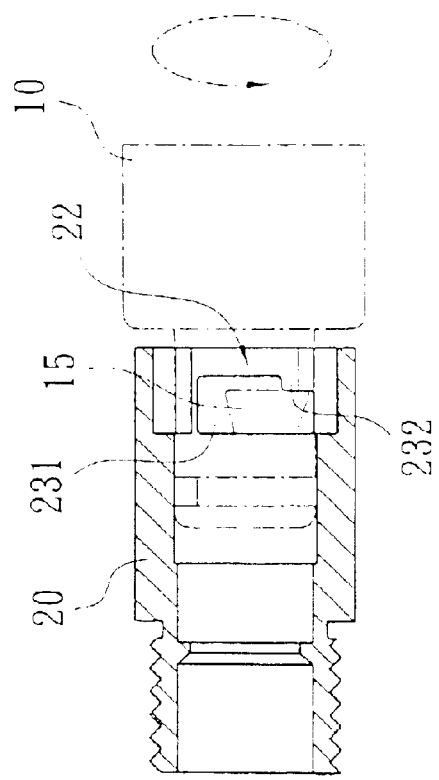
FIG. 7b shows that the locking elements are being engaged in the locking hole and turned into the engagement position and against by the spring when releasing the downward pressure.

As shown in FIG. 3, when the invention is in use, the connecting rod 12 of the first connector 10 is inserted into the second connector 20 such that the front-end of the connecting rod 12 is against the pillar plug 30 of the second connector 20, and that the locking elements 15 of the first connector 10 are guided into the grooves 23 of the second connector 20. After tuning the first connector 10 and second connector 20 reversely at a certain angle, the locking elements 15 of the first connector 10 will slide along the sliding grooves 231 to the end of the stroke in the locking holes 22, i.e. the position adjacent to the stopper 233 for engagement purpose (as shown in FIGS. 7a and 7b). By way of the above actions, the water conduits 50, 60 would be coupled to each other without the risk of detachment. Furthermore, when the pillar plug 30 is pressed by the first connector 10, the O-ring 34 at one end of the pillar plug 30 will depart from the hole 241 and allow the fluid delivered by the first connector 10 may flow into the second connector 20 through the hole 241.

Referring to FIGS. 7a and 7b, when detaching the first connector 10 and the second connector 20, one shall press the first connector 10 to make the locking elements 15 released from the locking elements 232 inside of the hole 22, turn the first connector 10 at a certain angle to allow the locking elements 15 exit from the sliding grooves 231, and remove the first connector 10 along the grooves 23 from the second connector 20. The two water conduits 50,60 are thus instantly detached from each other.

Concluded above, the invention can allow the user to easily and instantly assemble and release the joint by way of the locking type connector structure and further make two water conduits instantly coupled or detached. The integral structure is simple and can be easily operated.

While certain novel features of this invention have been shown and described and are pointed out in the annexed Claims, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An instantly-released joint for water conduits, comprising:

a first connector in hollow form, one end thereof is coupled to a water conduit, and the other end thereof is extruded to form a connecting rod having two locking elements on the top, as well as a peripheral groove adjacent to the front-end edge where an O-ring is provided;

a second connector in hollow form, one end thereof is coupled to a water conduit, and the other end thereof is provided with locking holes on the surface; the inner wall of the second connector is provided with flanges in order to form a hole of smaller diameter; two corresponding grooves are provided on the front-end of the second connector such that the grooves can extend from the top of the second connector to the locking holes, in order to allow the locking elements on the first connector slide along the grooves to the locking holes for engagement purposes; and a pillar plug, having a close end and a free end which can operate as a valve; a larger outer ring is provided on the free end, while a leakage-proof flange is provided on the close end;

by way of the above-mentioned elements, the first connector can be coupled to a water conduit at one end, inserted to the second connector with the connecting rod at the other end, and coupled to the second connector by turning the connectors at a certain angle to inter-lock each other; a pillar plug and a spring are further provided inside of the second connector such that the spring may be against the pillar plug via its flexibility; an O-ring is mounted on the peripheral groove of the first connector while another O-ring is mounted on the peripheral groove at the end of a pillar plug which passes through the second connector, rendering the whole assembly being instantly released.

2. The instantly-released joint for water conduits according to claim 1, wherein the distance X between the corresponding grooves in the second connector is longer than the bore diameter Y of the second connector; and two sliding grooves extend along the periphery of the front-end of the second connector, while a locking element is provided on a corner of each locking hole, in order to form a stopper on the bottom of the sliding groove.

3. The instantly-released joint for water conduits according to claim 1, wherein the close end of the pillar plug is provided with a leakage-proof flange which is formed by mounting an O-ring on the peripheral groove of the pillar plug.

4. The instantly-released joint for water conduits according to claim 1, wherein each of the locking elements provided on the connecting rod of the first connector has an inclined plane.

5. The instantly-released joint for water conduits according to claim 1, wherein a plurality of openings are provided on the surface of the pillar plug such that the fluid can flow therethrough.

* * * * *